(12) United States Patent
Senda et al.

(10) Patent No.: US 8,676,935 B2
(45) Date of Patent: Mar. 18, 2014

(54) CONTENT DISTRIBUTING SYSTEM, FEATURE AMOUNT DISTRIBUTING SERVER, CLIENT, AND CONTENT DISTRIBUTING METHOD

(75) Inventors: Yuzo Senda, Tokyo (JP); Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 752 days.

(21) Appl. No.: 12/866,227

(22) PCT Filed: Mar. 5, 2009

(86) PCT No.: PCT/JP2009/000993
§ 371 (c)(1),
(2), (4) Date: Aug. 4, 2010

(87) PCT Pub. No.: WO2009/110238
PCT Pub. Date: Sep. 11, 2009

(65) Prior Publication Data
US 2010/0318635 A1    Dec. 16, 2010

(30) Foreign Application Priority Data
Mar. 7, 2008   (JP) .................. 2008-058738 2008

(51) Int. Cl.
*G06F 15/16* (2006.01)
(52) U.S. Cl.
USPC .......................................... 709/219; 709/223
(58) Field of Classification Search
USPC ........................................................ 709/219
See application file for complete search history.

(56) References Cited

U.S. PATENT DOCUMENTS

| 5,446,492 | A  | * | 8/1995  | Wolf et al. ............... 348/192 |
| 6,496,221 | B1 | * | 12/2002 | Wolf et al. ............... 348/192 |
| 7,471,340 | B1 | * | 12/2008 | Chowdhury et al. ...... 348/572 |
| 2004/0160622 | A1 | * | 8/2004 | Kawada et al. ........... 358/1.15 |

FOREIGN PATENT DOCUMENTS

| EP | 1251703 A2 | 10/2002 |
| JP | 2000092522 A | 3/2000 |
| JP | 2003298554 A | 10/2003 |
| JP | 2003319420 A | 11/2003 |
| JP | 2005303451 A | 10/2005 |
| JP | 2007019802 A | 1/2007 |

OTHER PUBLICATIONS

International Search Report for PCT/JP2009/000993 mailed Jun. 6, 2009.
European search report for EP09717766.1 dated Nov. 22, 2012.

* cited by examiner

*Primary Examiner* — Phuoc Nguyen
*Assistant Examiner* — Kishin G Belani
(74) *Attorney, Agent, or Firm* — Sughrue Mion, PLLC

(57) ABSTRACT

In a content distributing system, a feature amount distributing server 140 includes a processing information generation unit 141 which generates processing information, a feature amount extraction unit 112 which extracts a content feature amount from distributed contents, a processing unit 142 which processes the content feature amount and generates a processed feature amount, a selecting unit 143 which selects an evaluation feature amount from the content feature amount or the processed feature amount, and a distributing unit 144 that distributes the evaluation feature amount to a client 130. A monitoring server 117 has a warning unit which collates the processing information generated by the processing information generation unit 141 of the feature amount distributing server 140 and a quality evaluation value received from the client, and gives a warning when the processing information and the quality evaluation value are mismatched with each other.

13 Claims, 7 Drawing Sheets

FIG. 2

| PROCESSING INFORMATION | A A A B A A C A A A |
| --- | --- |
| NETWORK ERROR | 0 0 0 0 0 0 0 X 0 |
| REPORT FROM NORMAL CLIENT | 0 0 0 X 0 0 0 0 X 0 |
| REPORT FROM ABNORMAL CLIENT | 0 0 0 0 0 0 0 0 0 0 |
| REPORT FROM IMPERFECT CLIENT | 0 0 0 X 0 0 X 0 X 0 |

FIG. 4

| PROCESSING INFORMATION | AB | AC | BA | BA | AC | AB | CA |
|---|---|---|---|---|---|---|---|
| NETWORK ERROR | 0 | 0 | X | 0 | 0 | 0 | 0 |
| REPORT FROM NORMAL CLIENT | OX | OO | XX | XO | OO | OX | OO |
| REPORT FROM ABNORMAL CLIENT | <u>OO</u> | OO | <u>OO</u> | <u>OO</u> | OO | <u>OO</u> | OO |
| REPORT FROM IMPERFECT CLIENT | OX | <u>OX</u> | XX | XO | <u>OX</u> | OX | <u>XO</u> |

CONTENT DISTRIBUTING SYSTEM, FEATURE AMOUNT DISTRIBUTING SERVER, CLIENT, AND CONTENT DISTRIBUTING METHOD

TECHNICAL FIELD

The present invention relates to a system that distributes video contents or audio contents using a network and particularly, to a system that monitors a distribution quality.

BACKGROUND ART

As an associated system that distributes video contents or audio contents, for example, a system that is disclosed in Patent Document 1 is known. A block diagram illustrating an image quality analyzing method and an image quality analyzing apparatus that are disclosed in the same document is shown in FIG. 5.

Both the server side and the client side calculate feature amounts called quality parameters from video, compare the feature amounts, and evaluate the feature amounts, thereby measuring a quality to be perceived by a user.

A video content distributing system that is disclosed in Patent Document 2 is shown in FIG. 6. The video content distributing system includes a video distributing server 600 that distributes video contents, a client 700 that reproduces the video contents from the video distributing server 600, and a network 300 that connects the video distributing server 600 and the client 700 to each other. The network 300 may be an optical network, the Internet or a telephone network.

The video distributing server 600 includes a content accumulation unit 601 that accumulates video contents, an evaluation object determination unit 602 that determines video contents becoming quality evaluation objects, an evaluation position determination unit 603 that determines the positions of the quality evaluation objects among the video contents, a quality parameter calculation unit 604 that calculates a first quality parameter with respect to the positions of the quality evaluation objects among the video contents, a video content distributing unit 605 that executes processing to distribute the video contents to the client 700, a quality parameter receiving unit 606 that receives a second quality parameter calculated in the client 700, a quality evaluating unit 607 that compares the first quality parameter and the second quality parameter (calculates the difference of the first and second quality parameters) and calculates a quality evaluation parameter according to whether the difference is within an allowable value, and a usage unit 608 that executes predetermined processing based on the quality evaluation parameter. The video content distributing unit 605 executes digital watermark processing for inserting digital watermarks into the video contents or encoding processing for encoding the video contents.

The client 700 includes a video content receiving unit 701 that receives the video contents from the video distributing server 600, an evaluation object determination unit 702 that inputs the video contents including distribution destination information and distribution periods thereof, selects contents matched with the input contents from a database (not shown in the drawings), and determines the selected contents as video contents of evaluation objects, an evaluation position determination unit 703 that determines the positions of the evaluation objects among the video contents of the evaluation objects, based on at least one of a specific frame of an image frame and a pixel region of one frame, a quality parameter calculation unit 704 that calculates a second quality parameter from the video contents, and a quality parameter transmitting unit 705 that transmits the calculated second quality parameter to the video distributing server 600.

As examples of a method that determines the positions of the evaluation objects, a method that inputs the frame positions and the region positions of frame contents from the user side and a method that regards only regions where the motion compensation data amount calculated by encoding processing from the video contents is more than a predetermined threshold value as partial frames having motions and extracts the regions as the evaluation objects, which are simplest methods, are used. As another example of the method, processing for calculating a motion vector extended between video frames and determining regions where the magnitude is equal to or more than a threshold value as the positions of the evaluation objects is used.

A transmission quality deterioration adding apparatus 810 that is disclosed in Patent Document 3 is shown in FIG. 7. The transmission quality deterioration adding apparatus based on the associated technology is connected to a packet network 820 together with a counterpart terminal 830, and a situation where a packet stream including transmission quality deterioration transmitted from the transmission quality deterioration adding apparatus 810 is received in the counterpart terminal 830 and a situation where the counterpart terminal 830 transmits transmission quality information in a receiving terminal 831 to the transmission quality deterioration adding apparatus 810 are shown.

As an embodiment of a terminal that can monitor the transmission quality in the receiving terminal 831 and transmit a monitoring result as the transmission quality information, a terminal that mounts a RTCP XR protocol is known.

[Patent Document 1] Japanese Laid-open patent publication NO. 2000-92522
[Patent Document 2] Japanese Laid-open patent publication NO. 2003-319420
[Patent Document 3] Japanese Laid-open patent publication NO. 2005-30345

DISCLOSURE OF THE INVENTION

However, in the related art disclosed in Patent Documents, there is room for improvement as follows.

First, in Patent Document 1, the feature amount is transmitted from the client to the server and the server side compares the feature amounts and evaluates the feature amounts. However, load of the server side may be increased in large-scale distribution, such as distribution of multicast services.

Second, in Patent Document 2, in the case of the system where the client side evaluates the quality, diversity of a quality evaluating unit and a reporting unit causes problems. Individual processing is standardized and unified, but the diversity may remain with respect to individual disadvantages. For example, when "non-deterioration" or "pass" may be erroneously reported in spite of video being disturbed by a bug of a decoder, a problem of the system cannot be discovered if a user does not report the problem voluntarily.

Third, in Patent Document 3, not the quality of the video contents or the audio contents, the quality of the network, for example, delay, jitter, and packet loss are handled, and a packet stream is deteriorated without changing a quality evaluating parameter. The quality evaluating parameter is not transmitted and the operation of the evaluating unit is not confirmed. Accordingly, normal operation confirmation of the evaluating unit is disabled.

According to the present invention, there is provided a content distributing system in which a content distributing server distributes streams of contents to a client through a network, a feature amount distributing server distributes an evaluation feature amount for each quality evaluation unit of the contents to the client, and the client decodes reproduction contents from the streams of the contents, evaluates a quality of the reproduction contents using the evaluation feature amount, calculates a quality evaluation value, and reports the quality evaluation value to a monitoring server, the feature amount distributing server including: a processing information generation unit which generates processing information to determine whether to execute processing for each quality evaluation unit; a feature amount extraction unit which extracts a content feature amount from the contents; a processing unit which processes the content feature amount and generates a processed feature amount; a selecting unit which selects the content feature amount or the processed feature amount according to the processing information and sets the selected feature amount as the evaluation feature amount; and a distributing unit that distributes the evaluation feature amount to the client, and the monitoring server including: a warning unit which collates the processing information generated by the processing information generation unit of the feature amount distributing server and the quality evaluation value received from the client, and gives a warning when the processing information and the quality evaluation value are mismatched with each other.

According to the present invention, there is provided a feature amount distributing server that is used in a content distributing system in which a content distributing server distributes streams of contents to a client through a network, a feature amount distributing server distributes an evaluation feature amount for each quality evaluation unit of the contents to the client, and the client decodes reproduction contents from the streams of the contents, evaluates a quality of the reproduction contents using the evaluation feature amount, calculates a quality evaluation value, and reports the quality evaluation value to a monitoring server, the feature amount distributing server including: a feature amount extraction unit which extracts a content feature amount for each quality evaluation unit; a processing information generation unit which generates processing information to instruct whether to execute processing for each quality evaluation unit; a processing unit which processes the content feature amount and generates a processed feature amount; a selecting unit which selects the content feature amount when the processing information indicates non-processing and selects the processed feature amount when the processing information indicates processing, according to the processing information, and sets the selected feature amount as a quality evaluation feature amount; and a distributing unit which distributes the quality evaluation feature amount to the client.

According to the present invention, there is provided a client that is used in a content distributing system in which a content distributing server distributes streams of contents to a client through a network, a feature amount distributing server distributes a plurality of evaluation feature amounts for each quality evaluation unit of the contents to the client, and the client decodes reproduction contents from the streams of the contents, evaluates a quality of the reproduction contents using the evaluation feature amounts, calculates a quality evaluation value, and reports the quality evaluation value to a monitoring server, the client including: a unit which receives the streams and the plurality of evaluation feature amounts for each quality evaluation unit; a decoding unit which decodes the reproduction contents from the stream; a quality evaluating unit which evaluates qualities of the reproduction contents using the plurality of evaluation feature amounts and calculates a plurality of quality evaluation values; and a reporting unit which reports the plurality of quality evaluation values to the monitoring server.

According to the present invention, there is provided a content distributing method in which a content distributing server distributes streams of contents to a client through a network, a feature amount distributing server distributes an evaluation feature amount for each quality evaluation unit of the contents to the client, and the client decodes reproduction contents from the streams of the contents, evaluates a quality of the reproduction contents using the evaluation feature amount, calculates a quality evaluation value, and reports the quality evaluation value to a monitoring server, the content distributing method including causing the feature amount distributing server to generate processing information to determine whether to execute processing for each quality evaluation unit, extract a content feature amount from the contents, process the content feature amount and generate a processed feature amount, select the content feature amount or the processed feature amount according to the processing information and set the selected feature amount as the evaluation feature amount, and distribute the evaluation feature amount to the client, and causing the monitoring server to collate the processing information generated by the processing information generation unit of the feature amount distributing server and the quality evaluation value received from the client, and give a warning when the processing information and the quality evaluation value are mismatched with each other.

According to the present invention, since actual deterioration in a client and detection of processing or non-processing are enabled, it can be confirmed that quality evaluating and reporting units are normally operated.

BRIEF DESCRIPTION OF THE DRAWINGS

The above and other objects, features, and advantages of the present invention will be more apparent from the following description of certain preferred embodiments taken in conjunction with the accompanying drawings, in which:

FIG. 2 illustrates the operation of the content distributing system according to the first embodiment of the present invention;

FIG. 4 illustrates the operation of the content distributing system according to the second embodiment of the present invention;

BEST MODE FOR CARRYING OUT THE INVENTION

Figure 1:
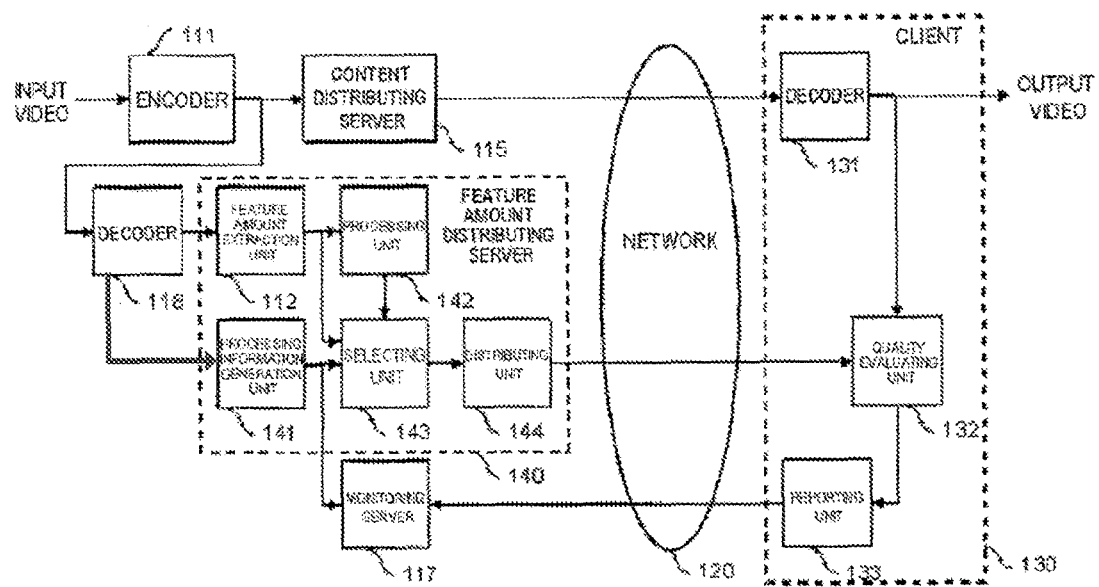
FIG. 1 illustrates a content distributing system according to a first embodiment of the present invention.

Hereinafter, embodiments of the present invention will be described using the drawings. Like reference numerals denote like elements throughout the drawings and the description will not be repeated.
(First Embodiment)
A content distributing system according to this embodiment is a content distributing system in which a content distributing server 115 distributes streams of contents to a client 130 through a network 120, a feature amount distributing server 140 distributes an evaluation feature amount for each quality evaluation unit of the contents to the client 130, and the client 130 decodes reproduction contents from the streams of the contents, evaluates a quality of the reproduction contents using the evaluation feature amount, calculates a quality evaluation value, and reports the quality evaluation value to a monitoring server 117. The feature amount distributing server 140 includes a processing information generation unit 141 that generates processing information to determine whether to execute processing for each quality evaluation unit, a feature amount extraction unit 112 that extracts a content feature amount from the contents, a processing unit 142 that processes the content feature amount and generates a processed feature amount, a selecting unit 143 that selects the content feature amount or the processed feature amount according to the processing information and sets the selected feature amount as an evaluation feature amount, and a distributing unit 144 that distributes the evaluation feature amount to the client 130. The monitoring server 117 has a warning unit that collates the processing information generated by the processing information generation unit 141 of the feature amount distributing server 140 and the quality evaluation value received from the client 130 and gives a warning when the processing information and the quality evaluation value are mismatched with each other.

The configuration of FIG. 1 will be described in detail. Input video is converted into streams by an encoder 111 and the obtained video streams are distributed to the client 130 by the content distributing server 115. The video streams are converted into reproduction video by a decoder 118. The feature amount distributing server 140 includes a feature amount extraction unit 112, a processing information generation unit 141, a processing unit 142, a selecting unit 143, and a distributing unit 144. The feature amount extraction unit 112 extracts a content feature amount for each frame of the reproduction video. The processing information generation unit 141 generates processing information to determine whether to execute processing or which kind of processing, for each frame. The processing unit 142 processes the feature amount of the contents and generates a processed feature amount. In this case, the processing means that original data contents are changed by a predetermined ratio. The selecting unit 143 selects the content feature amount or the processed feature amount according to the processing information and sets the selected feature amount as the evaluation feature amount. The distributing unit 144 distributes the evaluation feature amount to the client 130. The client 130 includes a decoder 131, a quality evaluating unit 132, and a reporting unit 133. The decoder 131 decodes streams to obtain reproduction video and outputs the reproduction video. The quality evaluating unit 132 calculates a quality evaluation value of a frame of the reproduction video, using the received evaluation feature amount. The reporting unit 133 reports the obtained quality evaluation value to the monitoring server 117. The monitoring server 117 collates the processing information and the quality evaluation value, and gives a warning when the processing information and the quality evaluation value are mismatched with each other. Matching of the processing information and the quality evaluation value is not limited to the case where the evaluation feature amount of the processing information and the quality evaluation value are completely matched with each other in all bits, and also includes the case where the number of mismatched bits is equal to or less than a predetermined threshold value, even though the evaluation feature amount and the quality evaluation value are not completely matched with each other. The threshold value that is used to determine whether the processing information and the quality evaluation value are matched or mismatched is plural and is stored in the monitoring server.

Processing of the processing unit 142 includes two kinds of processing. In the first processing, when the decoder 131 normally decodes streams, the feature amount is changed such that the quality evaluation value obtained by the equality evaluating unit 132 becomes out of a quality reference. This means that the quality is evaluated in expectation of the quality evaluation value becoming out of the equality reference in the upstream side, in the case where the quality is evaluated in the downstream side. In the second processing, when the decoder 131 normally decodes streams, the feature amount is changed within a range where the quality evaluation value obtained by the equality evaluating unit 132 satisfies the quality reference. Since the second processing is the evaluation in the normal range, the problem can be resolved even though the second processing is not performed.

In this embodiment, plural formats are considered in the quality evaluation value. First, when the quality evaluation value is represented by a binary value according to whether the quality evaluation value satisfies the predetermined quality reference, information on whether the quality evaluation value indicates deterioration in the monitoring server 117 is represented using the binary value. In addition to the binary value, a scalar value that represents an absolute quality or a deterioration amount or vector values that represent some quality items may be used. In this case, the monitoring server 117 determines whether these values satisfy the quality reference and determines whether the quality evaluation value indicates deterioration.

In the collation of the monitoring server 117, in each frame, when a combination of the processing information and the quality evaluation value indicates non-processing and non-deterioration, deterioration in the first processing, and non-deterioration in the second processing, it is determined that the processing information and the quality evaluation value are matched with each other. In the other cases, it is determined that the processing information and the quality evaluation value are mismatched with each other. If the quality evaluation value with respect to the evaluation feature amount of non-processing indicates deterioration, the monitoring server warns that the quality of the video is actually deteriorated. If the quality evaluation value with respect to the evaluation feature amount of the first processing does not indicate deterioration, the monitoring server warns that the quality evaluating unit 132 or the reporting unit 133 in the client 130 may have a problem. As compared with a ratio in which it is reported that the quality evaluation value of the frame of non-processing is out of the quality reference, when a ratio in which it is reported that the quality evaluation value of the frame after the second processing is out of the quality reference becomes more than a predetermined threshold value and increases, the monitoring server warns that the possibility of deterioration occurring due to the decoder 131 exists.

The processing information generation unit 141 determines most of frames as non-processing and determines the remaining slight frames as the first processing or the second processing. For example, the processing information generation unit 141 determines most of frames as the first processing or the second processing with a frequency of one time for one minute as average and determines the other frames as non-processing. This reason is that non-processing is to detect the quality deterioration of the video, the first processing and the second processing are to detect a problem in the client, non-expected quality deterioration needs to be securely detected, and a problem that can be normally detected may be occasionally inspected. Accordingly, the processing information generation unit 141 may represent the quality evaluation value by a system uniquely determined from a predetermined parameter.

In this configuration, the content distributing server 115, the feature amount distributing server 140, and the monitoring server 117 may be physically the same machine. The processing unit 142 may always perform processing or may perform processing only when the processing is required from the selecting unit 143. This is logically equivalent and the effect of the present invention is not lost.

The operation according to this embodiment will be described using FIG. 2. A horizontal direction indicates a progress of time and each column corresponds to a frame. A row of the processing information indicates processing information of each frame, A indicates non-processing, B indicates the first processing, and C indicates the second processing. In a row of a network error, O indicates normality and X indicates error. In a row of a report from the client, O indicates in the quality reference and X indicates out of the quality reference. A normal client reports that the quality evaluation value is out of the quality reference in a frame where the processing information becomes the first processing and a frame where network error occurs. The first X relates to the first processing and indicates the normal operation confirmation of the client and the other X indicates detection of actual occurrence of the quality deterioration. An abnormal client always reports that the quality evaluation value is in the quality reference and overlooks the frame of the first processing, and it can be seen that the report is not reliable. An imperfect client reports that the quality evaluation value of the frame of the second processing is out of the quality reference. By only this report, however, the network error and the decoder error cannot be distinguished. For this reason, the frequency where the quality evaluation value becomes out of the quality reference due to the network error is estimated from the report with respect to the non-processing. If the frequency where the quality evaluation value becomes out of the quality reference in the frame of the second processing is statically more than the estimated frequency, it can be seen that deterioration occurs due to the decoder.

(Second Embodiment)

Figure 3:
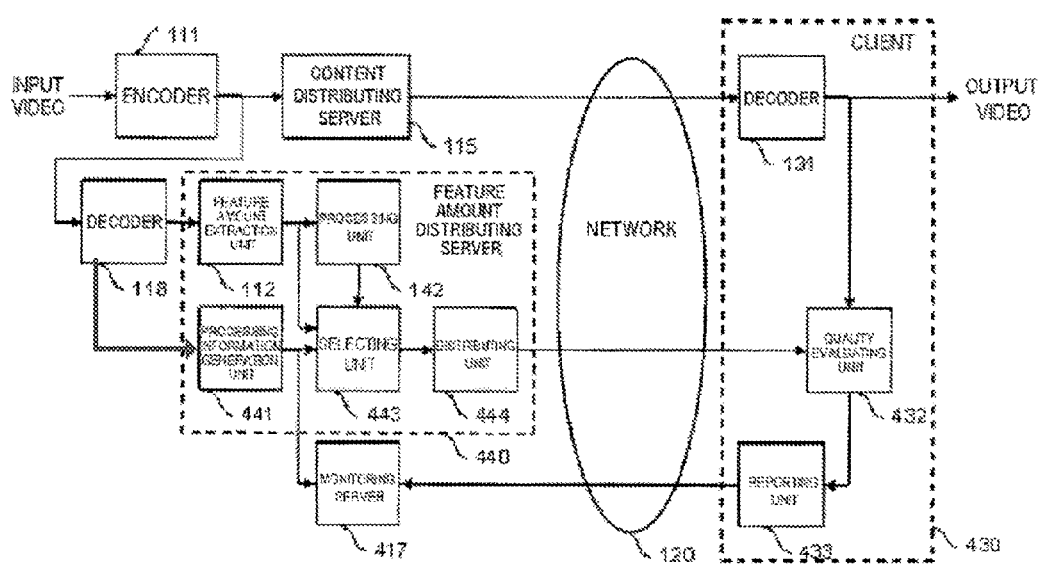
FIG. 3 illustrates a content distributing system according to a second embodiment of the present invention.
Figure 5:
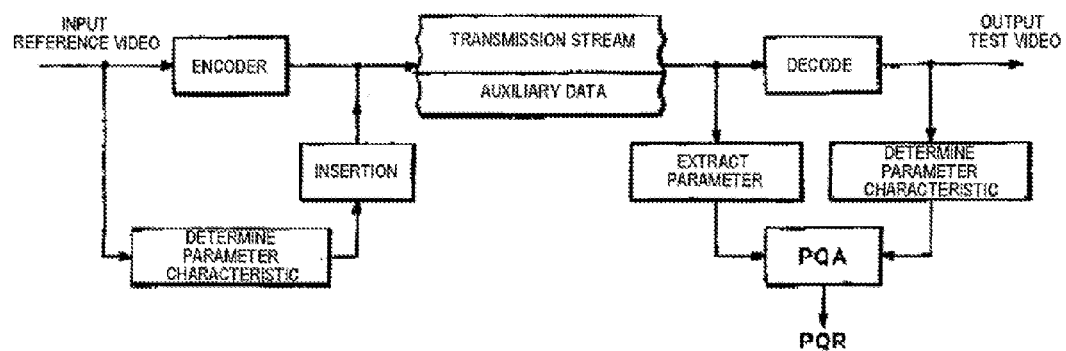
FIG. 5 illustrates an image quality analyzing method and an image quality analyzing apparatus according to a related art.
Figure 6:
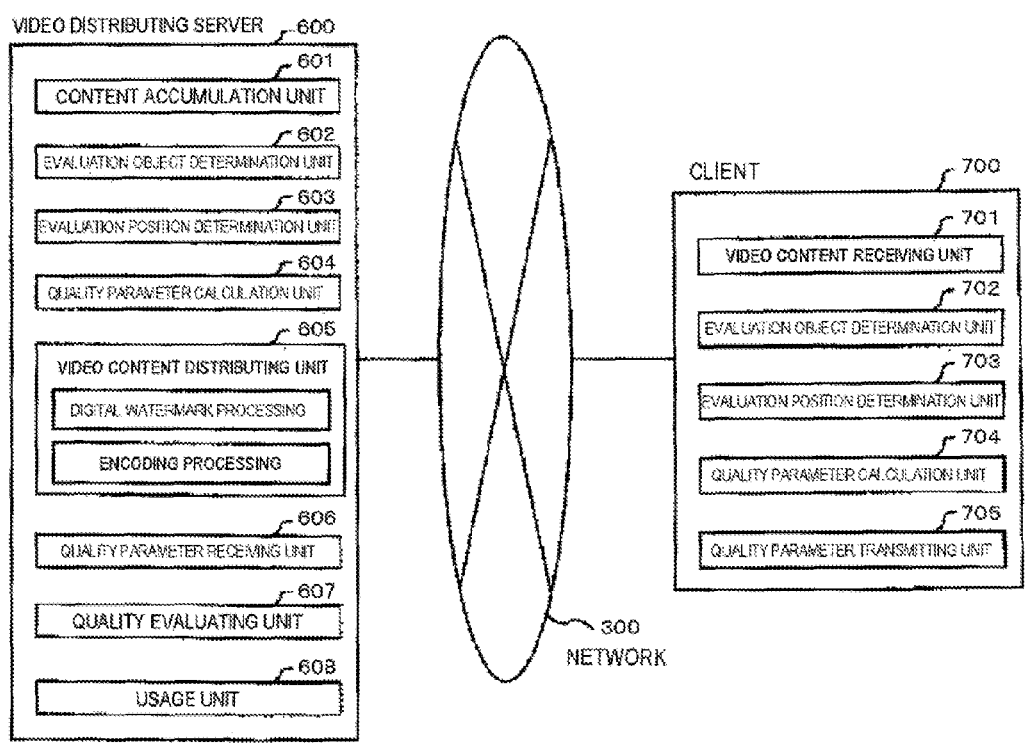
FIG. 6 illustrates the configuration of a video content distributing method according to the related art.
Figure 7:
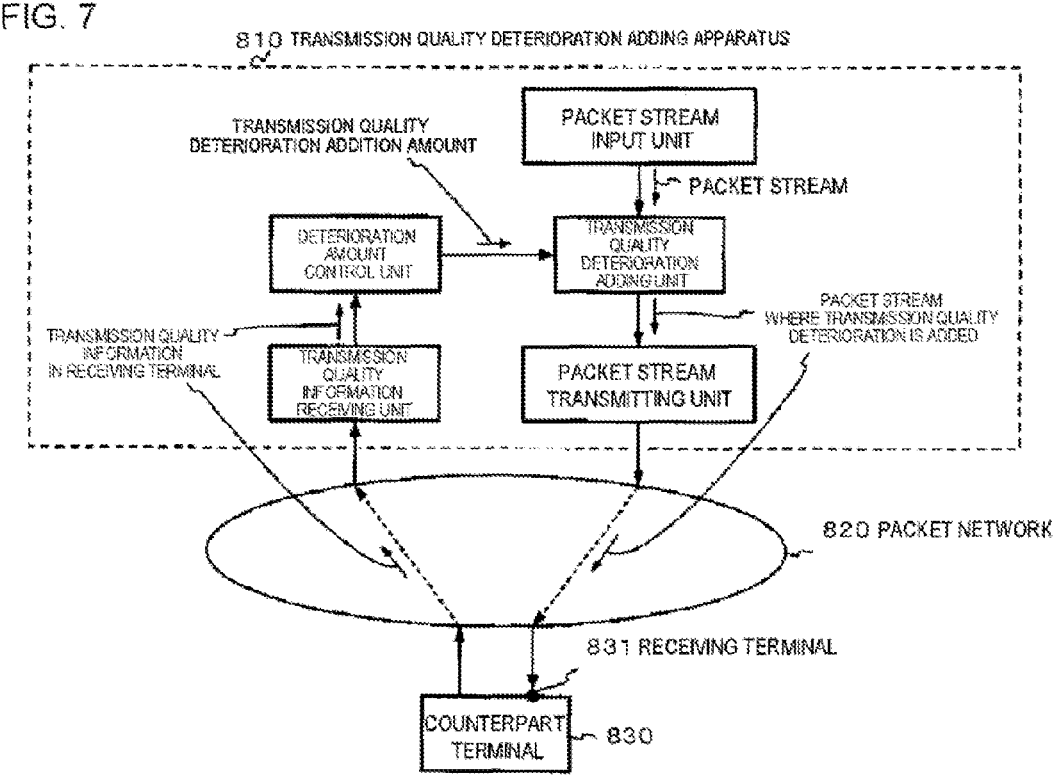
FIG. 7 illustrates a transmission quality deterioration adding apparatus according to the related art.

Next, the second embodiment of the present invention will be described with reference to FIG. 3 that illustrates the entire configuration of a distributing system. Input video is converted into video streams by the encoder 111 and the obtained video streams are distributed to the client 430 by the content distributing system 115. The video streams are converted into reproduction video by the decoder 118. The feature amount distributing server 440 includes a feature amount extraction unit 112, a processing information generation unit 441, a processing unit 142, a selecting unit 443, and a distributing unit 444. The feature amount extraction unit 112 extracts a content feature amount for each frame of the reproduction video. The processing information generation unit 441 generates processing information to determine whether to execute processing or which kind of processing, for each of the two evaluation feature amounts distributed for each frame. The processing unit 142 processes the feature amount of the contents and generates a processed feature amount.

The selecting unit 443 selects the content feature amount or the processed feature amount according to the processing information and sets the selected feature amount as the evaluation feature amount. The distributing unit 444 distributes the evaluation feature amount to the client 430. The client 430 includes a decoder 131, a quality evaluating unit 432, and a reporting unit 433. The decoder 131 decodes streams to obtain reproduction video and outputs the reproduction video. The quality evaluating unit 432 calculates a quality evaluation value of a frame of the reproduction video, for each of the evaluation feature amounts. The reporting unit 433 reports the obtained two quality evaluation values to the monitoring server 417. The monitoring server 417 collates the processing information and the quality evaluation value, and gives a warning when the processing information and the quality evaluation value are mismatched with each other.

The processing information generation unit 441 determines non-processing by anyone of the two processing information of each frame and determines the first processing or the second processing by the other. Since information with respect to the non-processing are essentially included in the quality evaluation value of each frame, overlooking of the quality deterioration is not generated.

In the collation of the monitoring server 417, in each frame, when a combination of the processing information and the quality evaluation value indicates non-processing and non-deterioration, deterioration in the first processing, and non-deterioration in the second processing, it is determined that the processing information and the quality evaluation value are matched with each other. In the other cases, it is determined that the processing information and the quality evaluation value are mismatched with each other. If the quality evaluation value with respect to the evaluation feature amount of non-processing indicates deterioration, the monitoring server warns that the quality of the video is actually deteriorated. If the quality evaluation value with respect to the evaluation feature amount of the first processing does not indicate deterioration, the monitoring server warns that the quality evaluating unit 432 or the reporting unit 433 in the client 430 may have a problem. In the case of non-processing and non-deterioration, if the second processing becomes deterioration, the monitoring server warns that deterioration occurs due to the decoder.

In this configuration, the content distributing server 115, the feature amount distributing server 440, and the monitoring server 417 may be physically the same machine. This is logically equivalent and the effect of the present invention is not lost. The description of the kind of processing and the format of the quality evaluation value are the same as the first embodiment.

The operation according to the second embodiment will be described using FIG. 4. In FIG. 4, a horizontal direction indicates a progress of time and each column corresponds to a frame. A row of the processing information indicates two processing information of each frame, A indicates non-processing, B indicates the first processing, and C indicates the second processing. In a row of a network error, O indicates normality and X indicates error. In a row of a report from the client, O indicates in the quality reference and X indicates out of the quality reference. A normal client reports that the quality evaluation value is out of the quality reference in a frame where the processing information becomes the first processing and a frame where the network error occurs. X with respect to the first processing indicates the normal operation confirmation of the client and X with respect to non-processing indicates detection of actual occurrence of the quality deterioration. An abnormal client always reports that the quality evaluation value is in the quality reference and overlooks the frame of the first processing, and it can be seen that the report is not reliable. An imperfect client reports that the quality evaluation value is out of the quality reference with respect to the second processing and the report result is not matched with the result of non-processing reported in the same frame. Therefore, it can be seen that deterioration occurs due to the decoder.

As a quality evaluating method that is used in the present invention, some examples will be described. In a quality evaluating method, the server side extracts brightness values of predetermined pixels, collects the brightness values, and distributes the brightness values as feature amounts to the client side, and the client side calculates the difference of the brightness values of the corresponding pixels in the decoded frames and the values in the feature amounts and evaluates the quality. In another quality evaluating method, the server side determines brightness values, generates pixel maps having the brightness values, collects the pixel maps, and distributes the pixel maps as the feature amounts, and the client side calculates the difference of the brightness values of the corresponding pixels of the frames decoded from the pixel maps in the feature amounts and the values in the feature amounts and evaluates the quality.

When these quality evaluating methods are used, increasing or decreasing the brightness values in the feature amounts in a predetermined range becomes one embodiment of the first processing or the second processing. That is, the brightness values are increased or decreased in a range where the quality evaluation value becomes deterioration in the first processing and in a range where the quality evaluation value becomes non-deterioration in the second processing. As another embodiment, the brightness values are replaced by random values, the same evaluation as the quality evaluating unit 432 is performed, and when the obtained result does not become a desired result, the processing may be executed again.

The processing method is not limited to the methods that are described herein. When other quality evaluating method is used, the first processing is realized by changing the extracted feature amount to a degree to which the quality evaluation value is out of the quality reference and the second processing is realized by changing the extracted feature amount in a range where the quality evaluation value satisfies the quality reference. The pass and fail with respect to the quality reference may be directly determined based on the feature amount or determined by performing the same evaluation as the quality evaluating unit 432.

In the embodiment of the present invention, the reproduction video is obtained by decoding the video stream and the feature amount of he reproduction video is extracted. However, similar to the related art, the feature amount may be directly extracted from the input video.

In the above description, one or two evaluation feature amounts are distributed with respect to each frame, but it is apparent that it is easy to distribute three or more evaluation feature amounts as a modification of the second embodiment. The processing of the two kinds is used, but processing of three kinds or more may be used by changing a degree to which the quality evaluation value is out of the quality reference.

(Third Embodiment)

Next, the third embodiment of the present invention will be described with reference to FIG. 1 that illustrates the entire configuration of a distributing system.

A content distributing method according to the present invention is a content distributing method in which a content distributing server 115 distributes streams of contents to a client 130 through a network, a feature amount distributing server 140 distributes an evaluation feature amount for each quality evaluation unit of the contents to the client 130, and the client 130 decodes reproduction contents from the streams of the contents, evaluates a quality of the reproduction contents using the evaluation feature amount, calculates a quality evaluation value, and reports the quality evaluation value to a monitoring server 117. In the content distributing method, the feature amount distributing server 140 generates processing information to determine whether to execute processing for each quality evaluation unit, extracts a content feature amount from the contents, processes the content feature amount and generates a processed feature amount, selects the content feature amount or the processed feature amount according to the processing information and sets the selected feature amount as an evaluation feature amount, and distributes the evaluation feature amount to the client 130. The monitoring server 117 collates the processing information that is generated by the processing information generation unit 141 of the feature amount distributing server 140 and the quality evaluation value that is received from the client 130 and gives a warning when the processing information and the quality evaluation value are mismatched with each other.

Input video is converted into video streams by the encoder ill and the obtained video streams are distributed to the client 130 by the content distributing system 115. The video streams are converted into reproduction video by the decoder 118. The feature amount distributing server 140 includes a feature amount extraction unit 112, a processing information generation unit 141, a processing unit 142, a selecting unit 143, and a distributing unit 144. The feature amount extraction unit 112 extracts a content feature amount for each frame of the reproduction video. The processing information generation unit 141 generates processing information to determine whether to execute processing or which kind of processing, for each frame. The processing unit 142 processes the feature amount of the contents and generates a processed feature amount. The selecting unit 143 selects the content feature amount or the processed feature amount according to the processing information and sets the selected feature amount as the evaluation feature amount. The distributing unit 144 distributes the evaluation feature amount to the client 130. The client 130 includes a decoder 131, a quality evaluating unit 132, and a reporting unit 133. The decoder 131 decodes streams to obtain reproduction video and outputs the reproduction video. The quality evaluating unit 132 calculates a quality evaluation value of a frame of the reproduction video, using the received evaluation feature amount. The reporting unit 133 reports the obtained quality evaluation value to the monitoring server 117. The monitoring server 117 collates the processing information and the quality evaluation value, and gives a warning when the processing information and the quality evaluation value are mismatched with each other.

Processing of the processing unit 142 includes two kinds processing. In the first processing, when the decoder 131 normally decodes streams, the feature amount is changed such that the quality evaluation value obtained by the equality evaluating unit 132 becomes out of a quality reference. In the second processing, when the decoder 131 normally decodes streams, the feature amount is changed within a range where the quality evaluation value obtained by the equality evaluating unit 132 satisfies the quality reference. Since the second processing is the evaluation in the normal range, the problem can be resolved even though the second processing is not performed.

The embodiments of the present invention have been described with reference to the drawings. However, the embodiments of the present invention are only exemplary and various configurations other than the embodiments may be adopted.

For example, the distribution of the video contents is not limited to the distribution of the video contents according to the first to third embodiments. If the video contents are read as audio contents and the frames are read as audio frames, the present invention can be embodied in distribution of the audio contents.

Further, the present invention may be configured as follows.

(1) In a content distributing system in which a content distributing server distributes streams of contents to a client through a network, a feature amount distributing server distributes an evaluation feature amount for each quality evaluation unit of the contents to the client, and the client decodes reproduction contents from the streams of the contents, evaluates a quality of the reproduction contents using the evaluation feature amount, calculates a quality evaluation value, and reports the quality evaluation value to a monitoring server, the feature amount distributing server includes a processing information generation unit which generates processing information to indicate whether to execute processing for each quality evaluation unit, a feature amount extraction unit which extracts a content feature amount from the contents, a processing unit which processes the content feature amount and generates a processed feature amount, a selecting unit which selects the content feature amount or the processed feature amount according to the processing information and sets the selected feature amount as the evaluation feature amount, and a distributing unit that distributes the evaluation feature amount to the client. The monitoring server has a warning unit which collates the processing information generated by the processing information generation unit of the feature amount distributing server and the quality evaluation value received from the client, and gives a warning when the processing information and the quality evaluation value are mismatched with each other.

(2) In the content distributing system, the processing information generation unit generates processing information to indicate which kind of processing is first processing or second processing, in addition to indicating whether to execute the processing, the processing unit generates a first processed feature amount where the content feature amount is changed such that a quality evaluation value of normal reproduction contents is out of a quality reference and a second processed feature amount where the content feature amount is changed in a range in which the quality evaluation value of the normal reproduction contents is in the quality reference, and the selecting unit selects the content feature amount when the processing information indicates non-processing, selects the first processed feature amount when the processing information indicates processing and the first kind, and selects the second processed feature amount when the processing information indicates processing and the second kind.

(3) In a feature amount distributing server that is used in a content distributing system in which a content distributing server distributes streams of contents to a client through a network, the feature amount distributing server distributes an evaluation feature amount for each quality evaluation unit of the contents to the client, and the client decodes reproduction contents from the streams of the contents, evaluates a quality of the reproduction contents using the evaluation feature amount, calculates a quality evaluation value, and reports the quality evaluation value to a monitoring server, the feature amount distributing server includes a feature amount extraction unit which extracts a content feature amount for each quality evaluation unit, a processing information generation unit which generates processing information to indicate whether to execute processing for each quality evaluation unit, a processing unit which processes the content feature amount and generates a processed feature amount, a selecting unit which selects the content feature amount when the processing information indicates non-processing and selects the processed feature amount when the processing information indicates processing, according to the processing information, and sets the selected feature amount as a quality evaluation feature amount, and a distributing unit which distributes the quality evaluation feature amount to the client.

(4) In a client that is used in a content distributing system in which a content distributing server distributes streams of contents to a client through a network, a feature amount distributing server distributes plural evaluation feature amounts for each quality evaluation unit of the contents to the client, and the client decodes reproduction contents from the streams of the contents, evaluates a quality of the reproduction contents using the evaluation feature amounts, calculates a quality evaluation value, and reports the quality evaluation value to a monitoring server, the client includes a unit which receives the streams and the plurality of evaluation feature amounts for each quality evaluation unit, a decoding unit which decodes the reproduction contents from the stream, a quality evaluating unit which evaluates qualities of the reproduction contents using the plurality of evaluation feature amounts and calculates plural quality evaluation values, and a reporting unit which reports the plurality of quality evaluation values to the monitoring server.

(5) In a content distributing method in which a content distributing server distributes streams of contents to a client through a network, a feature amount distributing server distributes an evaluation feature amount for each quality evaluation unit of the contents to the client, and the client decodes reproduction contents from the streams of the contents, evaluates a quality of the reproduction contents using the evaluation feature amount, calculates a quality evaluation value, and reports the quality evaluation value to a monitoring server, the content distributing method includes causing the feature amount distributing server to generate processing information to indicate whether to execute processing for each quality evaluation unit, extract a content feature amount from the contents, process the content feature amount and generate a processed feature amount, select the content feature amount or :he processed feature amount according to the processing information and set the selected feature amount as the evaluation feature amount, and distribute the evaluation feature amount to the client, and causing the monitoring server to collate the processing information generated by the processing information generation unit of the feature amount distributing server and the quality evaluation value received from the client, and give a warning when the processing information and the quality evaluation value are mismatched with each other.

This application is the National Phase of PCT/JP2009/000993, filed Mar. 5, 2009, which claims the benefit of priority based on Japanese Patent Application No. 2008-058738, filed on Mar. 7, 2008, the disclosure of which is hereby incorporated by reference in its entirety.

The invention claimed is:

1. A content distributing system in which a content distributing server distributes streams of contents to a client through a network, a feature amount distributing server distributes an evaluation feature amount for each quality evaluation unit of said contents to said client, and said client decodes reproduction contents from the streams of said contents, evaluates a quality of said reproduction contents using said evaluation feature amount, calculates a quality evaluation value, and reports said quality evaluation value to a monitoring server, said feature amount distributing server comprising:
a processing information generation unit which generates processing information to determine whether to execute processing for each quality evaluation unit;
a feature amount extraction unit which extracts a content feature amount from said contents;
a processing unit which processes said content feature amount and generates a processed feature amount;
a selecting unit which selects said content feature amount or said processed feature amount according to said processing information and sets the selected feature amount as the evaluation feature amount; and
a distributing unit that distributes said evaluation feature amount to said client, and
said monitoring server comprising:
a warning unit which collates the processing information generated by said processing information generation unit of said feature amount distributing server and the quality evaluation value received from said client, and gives a warning when the processing information and the quality evaluation value are mismatched with each other,
wherein said processing unit generates the processed feature amount where said content feature amount is changed such that a quality evaluation value of normal reproduction contents is out of a quality reference and the processed feature amount is distributed to the client, and
wherein said warning unit determines mismatching when said processing information indicates processing and said quality evaluation value is in the quality reference.

2. The content distributing system as set forth in claim 1,
wherein said processing information generation unit generates processing information to determine whether which kind of processing is first processing or second processing, in addition to determining whether to execute the processing,
said processing unit generates another processed feature amount where said content feature amount is changed in a range in which the quality evaluation value of the normal reproduction contents is in the quality reference, and
said selecting unit selects said content feature amount when said processing information indicates non-processing, selects said processed feature amount when said processing information indicates processing and said first kind, and selects said another processed feature amount when said processing information indicates processing and said second kind.

3. A content distributing system in which a content distributing server distributes streams of contents to a client through a network, a feature amount distributing server distributes an evaluation feature amount for each quality evaluation unit of said contents to said client, and said client decodes reproduction contents from the streams of said contents, evaluates a quality of said reproduction contents using said evaluation feature amount, calculates a quality evaluation value, and reports said quality evaluation value to a monitoring server,
said feature amount distributing server comprising:
a processing information generation unit which generates processing information to determine whether to execute processing for each quality evaluation unit;
a feature amount extraction unit which extracts a content feature amount from said contents;
a processing unit which processes said content feature amount and generates a processed feature amount;
a selecting unit which selects said content feature amount or said processed feature amount according to said processing information and sets the selected feature amount as the evaluation feature amount; and
a distributing unit that distributes said evaluation feature amount to said client, and
said monitoring server comprising:
a warning unit which collates the processing information generated by said processing information generation unit of said feature amount distributing server and the quality evaluation value received from said client, and gives a warning when the processing information and the quality evaluation value are mismatched with each other,
wherein said processing information generation unit generates processing information to determine whether which kind of processing is first processing or second processing, in addition to determining whether to execute the processing,
said processing unit generates a first processed feature amount where said content feature amount is changed such that a quality evaluation value of normal reproduction contents is out of a quality reference and a second processed feature amount where said content feature amount is changed in a range in which the quality evaluation value of the normal reproduction contents is in the quality reference, and
said selecting unit selects said content feature amount when said processing information indicates non-processing, selects said first processed feature amount when said processing information indicates processing and said first kind, and selects said second processed feature amount when said processing information indicates processing and said second kind.

4. The content distributing system as set forth in claim 1,
wherein said processing information generation unit generates a plurality of pieces of processing information for each quality evaluation unit,
said distributing unit distributes a plurality of evaluation feature amounts corresponding to said plurality of pieces of processing information for each quality evaluation unit to the client, and
said client has a decoding unit which receives said streams and reproduces reproduction contents, a quality evaluating unit which receives said plurality of evaluation feature amounts, evaluates said reproduction contents using said plurality of evaluation feature amounts, respectively, and calculates a plurality of quality evaluation values, and a reporting unit which reports said plurality of quality evaluation values to said monitoring server.

5. The content distributing system as set forth in claim 4,
wherein at least one of said plurality of pieces of processing information for each quality evaluation unit indicates non-processing.

6. The content distributing system as set forth in claim 1,
wherein said processing unit changes a brightness value of said content feature amount.

7. The content distributing system as set forth in claim 1,
wherein said processing information generation unit generates the processing information showing non-processing or processing with a predetermined frequency.

8. The content distributing system as set forth in claim 3,
wherein said processing information generation unit generates the processing information showing non-processing, processing and the first kind, or processing and the second kind with a predetermined frequency.

9. A feature amount distributing server that is used in a content distributing system in which a content distributing server distributes streams of contents to a client through a network, said feature amount distributing server distributes an evaluation feature amount for each quality evaluation unit of said contents to said client, and said client decodes reproduction contents from the streams of said contents, evaluates a quality of said reproduction contents using said evaluation feature amount, calculates a quality evaluation value, and reports said quality evaluation value to a monitoring server, said feature amount distributing server comprising:

a feature amount extraction unit which extracts a content feature amount for each quality evaluation unit;

a processing information generation unit which generates processing information to instruct whether to execute processing for each quality evaluation unit;

a processing unit which processes said content feature amount and generates a processed feature amount;

a selecting unit which selects said content feature amount when the processing information indicates non-processing and selects said processed feature amount when the processing information indicates processing, according to said processing information, and sets the selected feature amount as a quality evaluation feature amount; and a distributing unit which distributes said quality evaluation feature amount to said client, wherein said processing unit generates the processed feature amount where said content feature amount is changed such that a quality evaluation value of normal reproduction contents is out of a quality reference and the processed feature amount is distributed to the client, and wherein a warning unit determines mismatching when said processing information indicates processing and said quality evaluation value is in the quality reference.

10. A content distributing method in which a content distributing server distributes streams of contents to a client through a network, a feature amount distributing server distributes an evaluation feature amount for each quality evaluation unit of said contents to said client, and said client decodes reproduction contents from the streams of said contents, evaluates a quality of said reproduction contents using said evaluation feature amount, calculates a quality evaluation value, and reports said quality evaluation value to a monitoring server, said content distributing method comprising:

causing said feature amount distributing server to generate processing information to determine whether to execute processing for each quality evaluation unit, extract a content feature amount from said contents, process said content feature amount and generate a processed feature amount, select said content feature amount or said processed feature amount according to said processing information and set the selected feature amount as the evaluation feature amount, and distribute said evaluation feature amount to said client, and causing said monitoring server to collate said processing information generated by a processing information generation unit of said feature amount distributing server and the quality evaluation value received from said client, and give a warning when the processing information and the quality evaluation value are mismatched with each other, wherein a processing unit generates the processed feature amount where said content feature amount is changed such that a quality evaluation value of normal reproduction contents is out of a quality reference and the processed feature amount is distributed to the client, and wherein a warning unit determines mismatching when said processing information indicates processing and said quality evaluation value is in the quality reference.

11. The content distributing system as set forth in claim 3, wherein said warning unit compares a ratio in which said quality evaluation value is out of the quality reference when said processing information indicates non-processing and a ratio in which said quality evaluation value is out of the quality reference when said processing information indicates processing and said second kind, and determines mismatching when the latter is statistically significantly more than the former.

12. A feature amount distributing server that is used in a content distributing system in which a content distributing server distributes streams of contents to a client through a network, said feature amount distributing server distributes an evaluation feature amount for each quality evaluation unit of said contents to said client, and said client decodes reproduction contents from the streams of said contents, evaluates a quality of said reproduction contents using said evaluation feature amount, calculates a quality evaluation value, and reports said quality evaluation value to a monitoring server, said feature amount distributing server comprising:

a feature amount extraction unit which extracts a content feature amount for each quality evaluation unit;

a processing information generation unit which generates processing information to instruct whether to execute processing for each quality evaluation unit;

a processing unit which processes said content feature amount and generates a processed feature amount;

a selecting unit which selects said content feature amount when the processing information indicates non-processing and selects said processed feature amount when the processing information indicates processing, according to said processing information, and sets the selected feature amount as a quality evaluation feature amount; and a distributing unit which distributes said quality evaluation feature amount to said client, wherein said processing information generation unit generates processing information to determine whether which kind of processing is first processing or second processing, in addition to determining whether to execute the processing, said processing unit generates a first processed feature amount where said content feature amount is changed such that a quality evaluation value of normal reproduction contents is out of a quality reference and a second processed feature amount where said content feature amount is changed in a range in which the quality evaluation value of the normal reproduction contents is in the quality reference, and said selecting unit selects said content feature amount when said processing information indicates non-processing, selects said first processed feature amount when said processing information indicates processing and said first kind, and selects said second processed feature amount when said processing information indicates processing and said second kind.

13. A content distributing method in which a content distributing server distributes streams of contents to a client through a network, a feature amount distributing server distributes an evaluation feature amount for each quality evaluation unit of said contents to said client, and said client decodes reproduction contents from the streams of said contents, evaluates a quality of said reproduction contents using said evaluation feature amount, calculates a quality evaluation value, and reports said quality evaluation value to a monitoring server, said content distributing method comprising:

causing said feature amount distributing server to generate processing information to determine whether to execute processing for each quality evaluation unit, extract a content feature amount from said contents, process said content feature amount and generate a processed feature amount, select said content feature amount or said processed feature amount according to said processing information and set the selected feature amount as the evaluation feature amount, and distribute said evaluation feature amount to said client, and causing said monitoring server to collate said processing information generated by said processing information generation unit of said feature amount distributing server and the quality evaluation value received from said client, and give a warning when the processing information and the quality evaluation value are mismatched with each other, wherein said processing information generation unit generates processing information to determine whether which kind of processing is first processing or second processing, in addition to determining whether to execute the processing, said processing unit generates a first processed feature amount where said content feature amount is changed such that a quality evaluation value of normal reproduction contents is out of a quality reference and a second processed feature amount where said content feature amount is changed in a range in which the quality evaluation value of the normal reproduction contents is in the quality reference, and said selecting unit selects said content feature amount when said processing information indicates non-processing, selects said first processed feature amount when said processing information indicates processing and said first kind, and selects said second processed feature amount when said processing information indicates processing and said second kind.

\* \* \* \* \*